US007062469B2

(12) United States Patent
Meyers et al.

(10) Patent No.: US 7,062,469 B2
(45) Date of Patent: Jun. 13, 2006

(54) SYSTEM AND METHOD FOR PUBLIC WIRELESS NETWORK ACCESS SUBSIDIZED BY DYNAMIC DISPLAY ADVERTISING

(75) Inventors: Stephan Meyers, Los Angeles, CA (US); Janne Uusilehto, Tampere (FI)

(73) Assignee: Nokia Corporation, Espoo (FI)

( * ) Notice: Subject to any disclaimer, the term of this patent is extended or adjusted under 35 U.S.C. 154(b) by 231 days.

(21) Appl. No.: 09/750,772

(22) Filed: Jan. 2, 2001

(65) Prior Publication Data
US 2002/0087335 A1   Jul. 4, 2002

(51) Int. Cl.
G06F 17/60     (2006.01)
(52) U.S. Cl. .................. 705/64; 705/67; 705/1
(58) Field of Classification Search ............... 370/352, 370/355; 455/414; 705/14, 18, 75, 1, 26; 340/643; 235/383
See application file for complete search history.

(56) References Cited

U.S. PATENT DOCUMENTS

| 5,519,794 | A | 5/1996 | Sandor et al. |
| 6,377,981 | B1 * | 4/2002 | Ollikainen et al. ......... 709/217 |
| 6,386,450 | B1 * | 5/2002 | Ogasawara ................. 235/383 |
| 6,418,138 | B1 * | 7/2002 | Cerf et al. .................. 370/352 |
| 6,513,015 | B1 * | 1/2003 | Ogasawara .................. 705/26 |

FOREIGN PATENT DOCUMENTS

JP     02002152807 A  *  5/2002
WO     WO 99/27462    *  3/1999

* cited by examiner

Primary Examiner—Elisca Pierre Eddy
(74) Attorney, Agent, or Firm—Banner & Witcoff, Ltd.

(57) ABSTRACT

System and method for public wireless network access subsidized by dynamic display advertising that includes a mobile device at a location, such as a commercial establishment, detecting the presence of a Local Area Network (LAN). The mobile device requests access to the LAN from node, e.g., a hub, on the LAN. The hub requests identification information from the mobile device. The mobile device sends user information that includes identification and demographic information about a user of the mobile device to the hub. The hub gives access to the LAN to the mobile device. The mobile device now has access to a global communication data network, such as the Internet, through the hub on the LAN. The hub sends the demographic information about the users of all mobile devices at the location to an advertising server. The hub receives commercial messages from the advertising server. The commercial messages are selected based on the demographic information of the users. The hub sends the commercial messages to a display where they are displayed at the location for viewing by the users.

42 Claims, 5 Drawing Sheets

SYSTEM AND METHOD FOR PUBLIC WIRELESS NETWORK ACCESS SUBSIDIZED BY DYNAMIC DISPLAY ADVERTISING

BACKGROUND

1. Field of the Invention

This invention relates to networks, and more specifically to public wireless access of networks.

2. Background Information

The per minute billing method used by existing wireless providers to bill users of Internet services has potential problems in the face of high bandwidth wireless interaction for future services. Generally, consumers will likely be unable to receive the service levels they desire at a reasonable and predictable cost using the per minute billing method. This leads to a situation where mobile device usage may be slow to achieve market penetration. Consumers are presently expected to pay for services and products over the wireless Internet. Due to the lowering cost and availability of Local Area Network (LAN), Wireless Local Area Network (802.11), and Bluetooth systems for wireless access, individual users will find it cost effective to install a wireless hub within their own homes. A LAN hub is relatively inexpensive, and achieves Internet connectivity as part of the same fee that users already pay for home Internet access via a modem, cable, Digital Subscriber Line (DSL), or other methods.

Local businesses, such as coffee shops, bars, or book stores, may similarly find it cost effective to install wireless hubs to draw customers. A modest fee to provide public wireless Internet access to customers would make the local business more attractive to customers by establishing the local business as a "hot spot". Hot spots are businesses that provide wireless public access to the Internet for their customers. Franchised chains of small businesses would probably be the first to explore this opportunity, thus creating small networks of "micro-operators" covering a single location or small subset of customers. However, providing WLAN services directly by a micro-operator requires that the operator shoulder the entire burden of payment, with no immediate tangible benefit. Therefore, a need exists to provide public wireless Internet access to consumers without a cost to the local business/hot spot providing the Internet access.

SUMMARY

The present invention is directed to systems and methods for public wireless network access subsidized by dynamic display advertising that includes a mobile device at a location, such as a commercial establishment, detecting the presence of a Local Area Network (LAN). The mobile device requests access to the LAN from a gateway connected to a hub on the LAN. The hub requests identification information from the mobile device. The mobile device sends user information that includes identification and demographic information about a user of the mobile device to the hub. The hub then gives access to the LAN to the mobile device. The mobile device now has access to a global communication data network, e.g., the Internet, through a second gateway. The hub sends the demographic information about the users of all mobile devices at the location to an advertising server. The hub receives commercial messages from the advertising server. The commercial messages are selected based on the demographic information of the users. The hub sends the commercial messages to a display where they are displayed at the location for viewing by the users.

Moreover, the present invention is directed to an article comprising a storage medium having instructions stored therein where the instructions when executed cause a processing device to perform: requesting identification information from at least one mobile device by a hub on a Local Area Network (LAN), the requesting occurring after the at least one mobile device at a location detected the presence of the LAN and requested access; receiving user information from each at least one mobile device at the hub, the user information including identification and demographic information about a user of each at least one mobile device; giving access to the LAN to the at least one mobile device; making a global communication data network, e.g., the Internet, accessible through a gateway to the at least one mobile device; sending the demographic information about the users of the at least one mobile devices at the location to an advertising server; receiving commercial messages at the hub from the advertising server, the commercial messages are selected based on the demographic information of the users; and sending the commercial messages to a display at the location for viewing by the users.

In addition, the present invention is directed to a processing device having instructions stored therein where the processing device is connected to a Local Area Network (LAN), and the instructions when executed cause the processing device to perform: requesting identification information from at least one mobile device by the processing device, the requesting occurring after the at least one mobile device at a location detected the presence of the LAN and requested access; receiving user information from each at least one mobile device at the processing device, the user information including identification and demographic information about a user of each at least one mobile device; giving access to the LAN to the at least one mobile device; making a global communication data network, e.g., the Internet, accessible through the processing device on the LAN to the at least one mobile device; sending the demographic information about the users of the at least one mobile devices at the location to an advertising server; receiving commercial messages at the processing device from the advertising server, the commercial messages are selected based on the demographic information of the users; and sending the commercial messages to a display at the location for viewing by the users.

The present invention is additionally directed to a method for public wireless paying network access that includes: selecting items to purchase at a commercial establishment by a customer; sending user information from a mobile device of the customer to a Local Area Network (LAN) at the commercial establishment, where the user information includes identification and demographic information about the customer; placing identification information for the customer into a queue, where the queue identifies customers ready to purchase items selected by each customer, the customer identification information is placed on the queue in a chronological order with the last placed customer information being at a bottom of the queue, and the contents of the queue is displayed at the commercial establishment for viewing by all customers; sending the demographic information about each customer on the queue to an advertising server; receiving commercial messages from the advertising server, where the commercial messages are selected based on the demographic information of the customers; sending the commercial messages to a display at the location for viewing by all customers at the commercial establishment; monitoring, by the customer, when the customer's identification information is at the top of the queue, where the customer pays for the selected items when the customer's identification information is at the top of the queue; and deleting the customer from the queue after the customer has purchased the selected items.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to system and methods for public wireless Internet access subsidized by dynamic display advertising. According to the present invention, a different operator/customer relationship exists that allows for a distributed, "grass roots" system, potentially generating profit for local micro-operators. The present invention allows for an infrastructure for identifying users of a local network hot spot. Further, the present invention provides a method for business operators of Internet services to recoup the costs of installing a hot spot. Moreover, the present invention allows for a profit structure that encourages distributed, individualized innovation and a decentralized operator structure that need not be controlled by a single entity.

Figure 1:
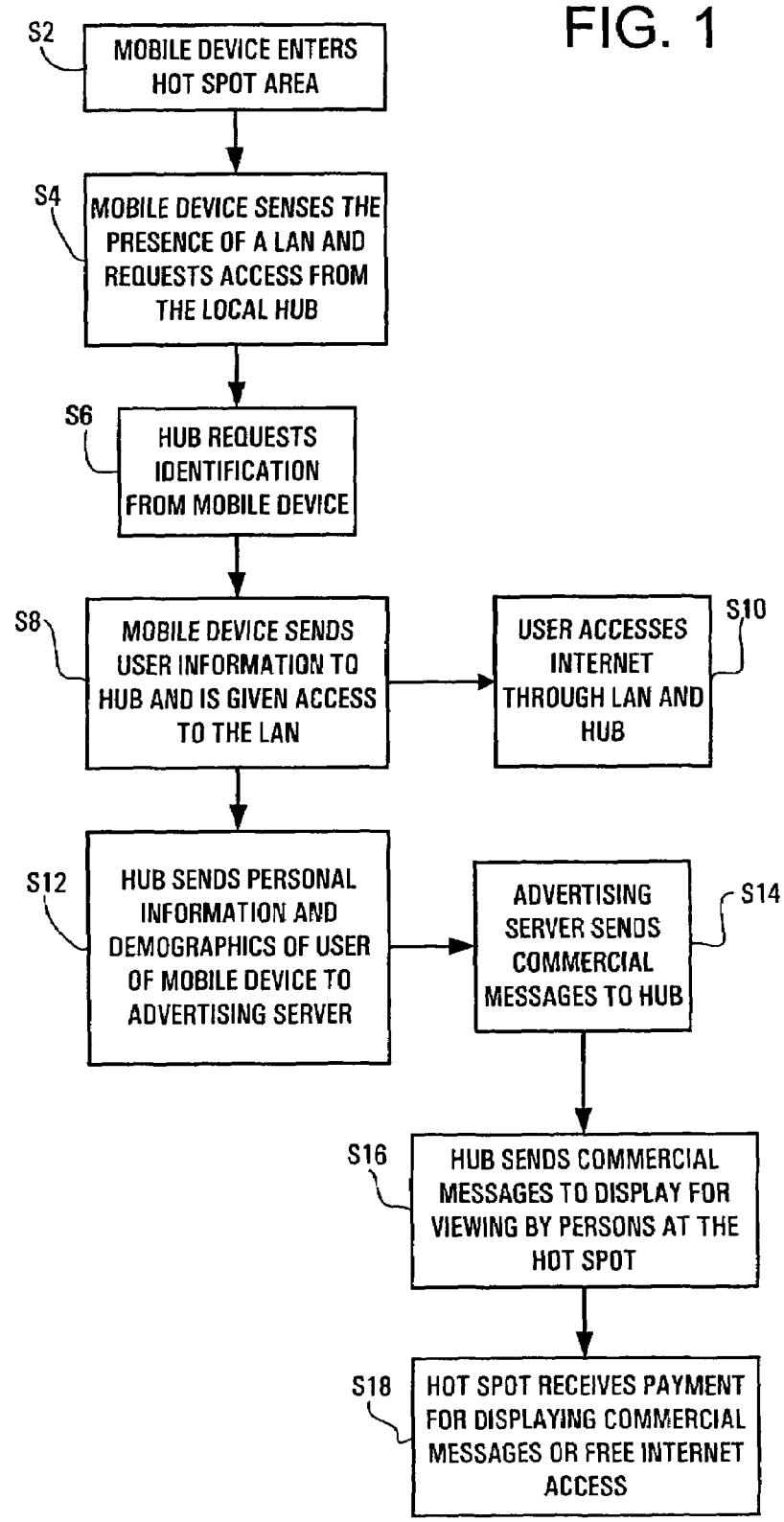
FIG. 1 is a flowchart of an example process for public wireless network access according to an example embodiment of the present invention.

FIG. 1 shows a flowchart of an example process for public wireless network access according to an example embodiment of the present invention. A consumer (i.e., user) passes by a neighborhood commercial establishment (business), for example, a "CoffeeStuff", an international chain of coffee stores. The consumer notices a sign outside the commercial establishment saying "network hot spot inside". The consumer then decides to drop into the CoffeeStuff hot spot and use the hot spot's network to update his subscriptions to various Internet services using his mobile device. Therefore, the consumer and mobile device enter the hot spot area S2.

Upon entering the store, the mobile device senses the presence of a local area network and requests access to the network through a gateway of the local hub connected to the local area network S4. The local area network may provide any of many types of wireless access solutions to the LAN, e.g., a WLAN, Bluetooth, or other type of wireless access. The hub then requests identification from the consumer's mobile device S6. In requesting identification from the mobile device, the hub may be set up to display a public wireless application protocol (WAP) page that may read "Welcome to CoffeeStuff, please let us have your user information, and then step up to the counter for a free coffee. We promise not to share your personal information with other companies." The consumer instructs the mobile device to send his user information to the hub, and upon receipt at the hub, the mobile device is given access to the local area network S8. The user information may include personal information such as name, address, phone number, email address, social security number, etc. The user information may also include demographic information such as age, income, profession, gender, hobbies, etc. This information may come from a profile stored on the mobile device, or may be manually entered by the consumer/user. The information may also be stored on a trusted server on the Internet, which may provide this information in response to a verified request from the user. The consumer now has wireless access to the Internet through the local area network and the hub S10. The consumer may use this access to get information, surf the web, or even make a free phone call using Voice Over Internet Protocol (VoIP).

Since in this example embodiment, CoffeeStuff is a chain of stores (i.e., franchise), the next time the consumer enters any location of CoffeeStuff, the consumer may not have to repeat the registration process of providing user information. The consumer may already be registered at all participating locations of CoffeeStuff. This may be similar to the "cookie" identification method used by web servers. The hub in the hot spot sends the personal information and demographic information of the user of the mobile device to an advertising server S12. Some of the highly personal information (social security number, address, phone number, etc.) may have been stripped off by the hub before sending the personal information to the advertising server.

The demographics of all other patrons in the hot spot that accessed the local area network may also be sent to the advertising server at the same time. The demographic information of hot spot patrons may be transmitted in aggregate according to known demographic groups (e.g., two males, ages 22–36, professional; one female, age 36–50, clerical; etc.). The information may also be sent as individual demographic information for each user. Moreover, the demographic information of users connected to the local area network at the hot spot may be periodically updated. For example, the hub may check users connected to the local area network whenever a new user connects to the local area network, and then send/resend updated demographic information of all users at the hot spot to the advertising server. Also, the hub may monitor users that disconnect from the local area network and then send/resend updated demographic information of all users at the hot spot to the advertising server. The hub may also choose to send updated demographic information of all users connected to the local area network at the hot spot at regular periodic intervals.

The local area network hub may further be connected to a display, such as a Liquid Crystal Display (LCD) monitor, which may display one or more commercial messages such as advertising. After receiving the demographic information from the hub, an advertising server may send commercial messages to the hub S14. The commercial messages sent may be selected based on the demographics of the consumers in the hot spot. It is assumed that in a typical hot spot, many users without mobile devices connected to the local area network have demographics resembling that of mobile device users that are accessing the local area network. Therefore, the mobile device users likely reflect other customers at the hot spot.

The commercial messages may include text, graphics, animation, etc. The hub may transfer the commercial messages to a display where the messages may be presented for viewing by the patrons in the hot spot S16. Therefore, advertisers using the advertising service are able to get the right ads directly to customers at the hot spot. This type of marketing is beneficial to advertisers since the right ads (selected based on the demographics of the users) are presented not only to the users, but to other customers at the hot spot that likely have similar demographics as the users.

The content and/or format of the commercial messages may be selected or generated by an advertising service, a company, advertiser, or other source. The commercial messages may be generated/selected based on comparing the demographic information of users at the hot spot with the content/subject matter of possible commercial messages. The commercial messages may be stored at the advertising server, or retrieved from another location by the advertising server when needed.

The hot spot may receive payment for displaying the commercial messages/advertising from an advertising service that controls the advertising server that sends the commercial messages. Alternatively, the advertising service may pay an Internet Service Provider (ISP) the cost for providing Internet service to the hot spot, therefore, making the cost of the hot spot's Internet access free to the hot spot. The payment may come directly from specific advertisers or companies, the products or services of which the commercial messages advertise, or from the advertising service to the hot spot or ISP. Moreover, advertisers or companies may pay the advertising service, where the advertising service then pays the hot spot or ISP.

If the hot spot receives payment for displaying the commercial messages, the hot spot may make a profit from displaying the commercial messages, even though the hot spot may have to pay the ISP for the Internet access. Payment may be based on the number of people in the store, the quality of user information provided by the users, the number of commercial messages displayed, or based on any of many possible mechanisms for calculating payment. Therefore, an individual hot spot may not have to pay any money to provide free Internet access to its patrons. The cost of the hub and the Internet service may be paid for from the advertising income, or by an advertising service, company, or advertiser. Further, according to the present invention, the hot spot may earn a profit based on the displaying of the commercial messages to its patrons. Therefore, the present invention is beneficial to all parties since the hot spot location owner draws more customers due to the free Internet access, the customers get free Internet services, and the advertisers pay the costs in exchange for getting the right advertisements to the right people.

As noted previously, the commercial messages and/or advertising may be directed to the group of people at the hot spot as an aggregate or may be directed to specific individuals. For example, if one demographic group of users at the hot spot is "female, single, 25–35 years old, professional", commercial messages related to business or fashionable women's clothing may be sent by the advertising server to the hub and displayed at the hot spot. Further, the advertising server may send commercial messages specifically targeted for specific users at the hot spot at varied times, or may send a commercial message specifically targeted for a specific user based on the user's demographic information immediately after the user's mobile device is connected to the local area network and the demographic information is received by the advertising server.

According to the present invention, the display device may be any suitable display (e.g., cathode ray tube (CRT), LCD, E-ink display, autostereoscopic lenticular monitor display, etc.). Further, hot spots (e.g., commercial establishments) may operate their own servers that display messages related to the commercial establishment such as in-store specials. Hot spots that operate their own servers may also have associations or partnerships with other commercial establishments or advertisers where the Local server at the hot spot also displays commercial messages from the other commercial establishments or advertisers. The hot spot may also receive some form of compensation from these other commercial establishments or advertisers. The display may be physically integrated with the local area network hub or separate. The hub and display unit may be connected by a cable, or may be connected by a wireless link. The hub may also have multiple displays, or may be connected to an additional audio/visual (A/V) display system at the commercial establishment, for example, playing audio advertising or music at the commercial establishment based on the demographics of users at the hot spot.

Figure 2:
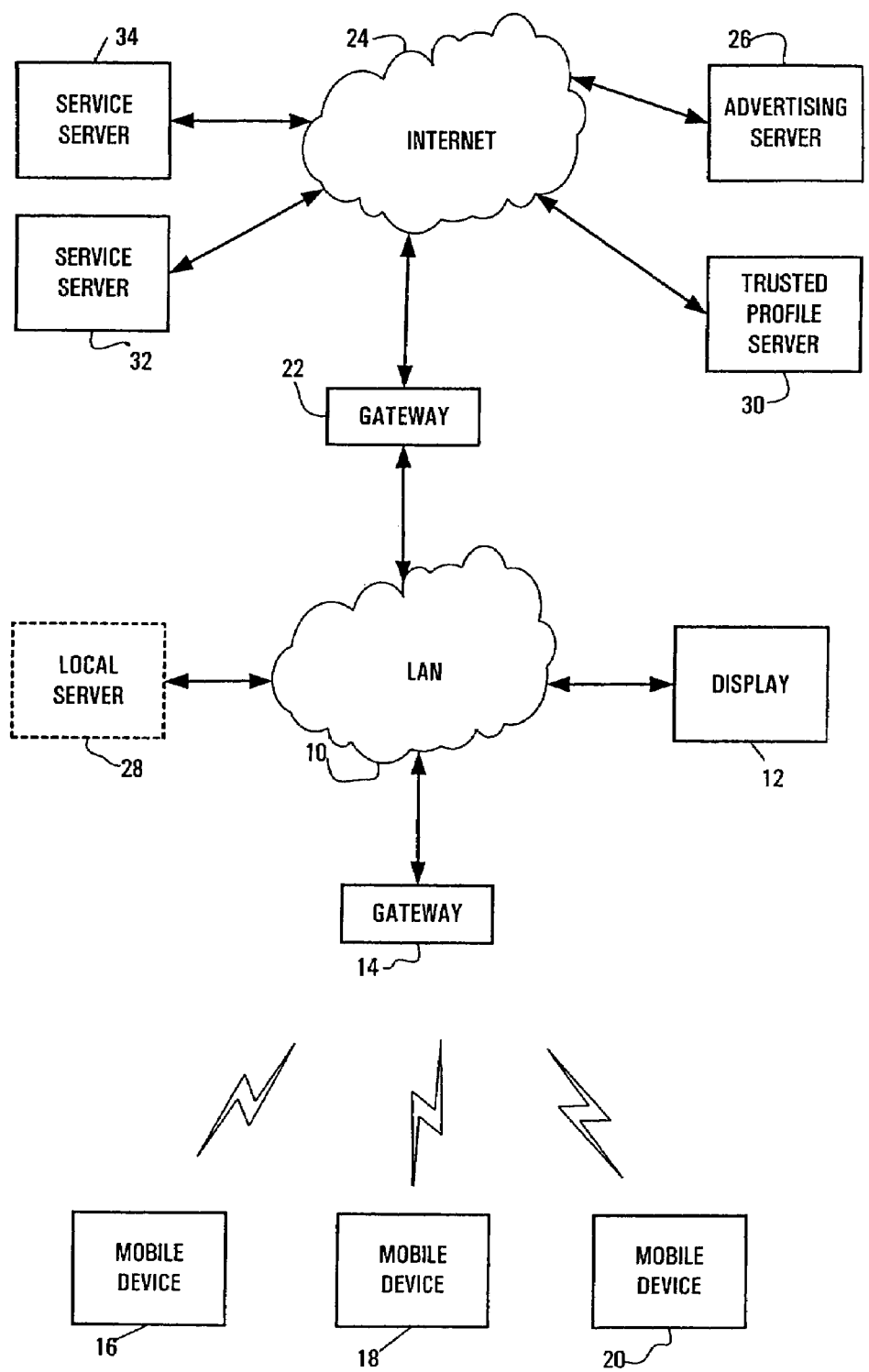
FIG. 2 is a block diagram of an example system for providing public wireless network access according to an example embodiment of the present invention.

FIG. 2 shows a block diagram of an example system for providing public wireless network access subsidized by dynamic display advertising according to an example embodiment of the present invention. In this example embodiment, a hub (not shown) in local area network (LAN) 10 is connected to a display 12 and a global communications data network, e.g., the Internet, 24 through a gateway 22. The global communications data network in this example embodiment is shown as the Internet, but the global communications data network may be any of many types of communication data networks and still be within the spirit and scope of the present invention. Several servers may be connected to Internet 24, such as an advertising server 26, one or more other servers 32,34, and a trusted profile server 30. Advertising server 26 contains advertisements and other messages that may be selected based on the demographics of users at the hot spot, sent to LAN 10 at the hot spot. Advertising server 26 may control display 12 during the display of the advertising. There may be one or several displays at the hot spot that display the advertising from server 26. Other servers, e.g. 32,34, may provide other services to devices and networks that can access Internet 24. Trusted profile server 30 may contain profile information for users of mobile devices that access the Internet. The profile information for a particular user may be provided to a destination based on a user request after the user request has been authenticated or verified by the trusted profile server 30. For example, a user may request that demographic information in his/her user profile be provided to the advertising server 26.

Mobile devices 16, 18, 20, etc., that enter the hot spot, access the hub in LAN 10, and a global communication network, e.g., the Internet, through gateway 14. Mobile devices 16, 18, and 20 have a wireless connection to LAN 10. Further, the hot spot may include its own local server 28 that may be connected to a hub in LAN 10. The connection between LAN 10 and the Internet 24 preferably is a wired connection, but may also be wireless. Moreover, the connection between LAN 10 and display 12 may be wired or wireless. Systems for providing public wireless Internet access subsidized by dynamic display advertising according to the present invention may include one or more hubs, one or more displays, and/or one or more local servers.

Figure 3:
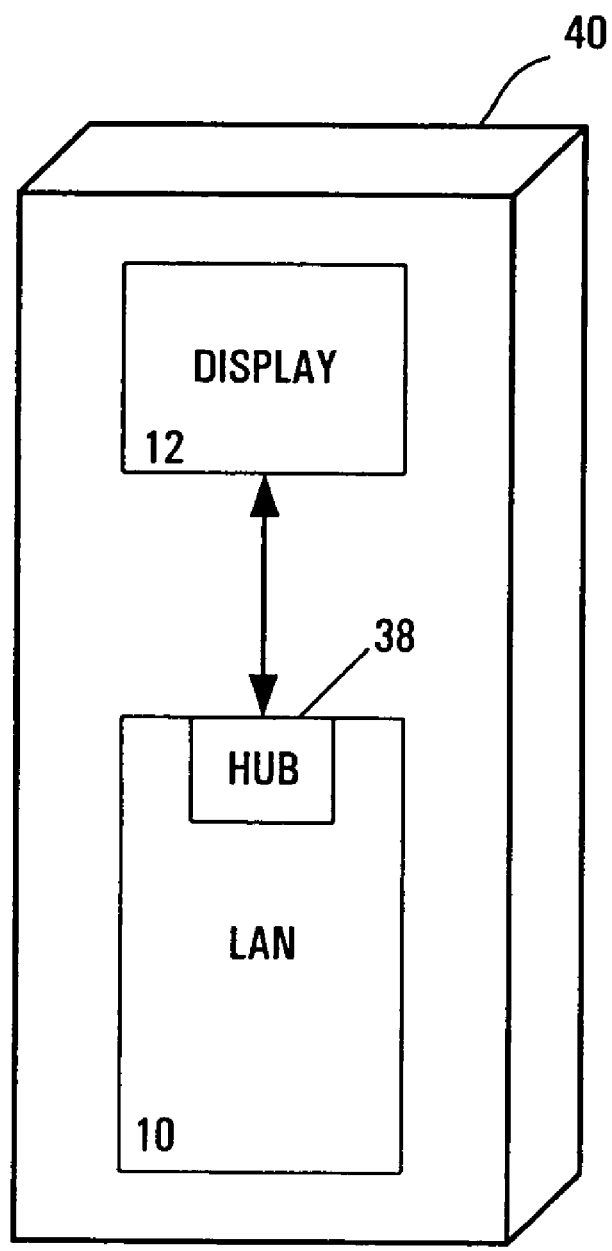
FIG. 3 is a block diagram of an enclosure unit containing the system of the present invention according to an example embodiment of the present invention.

FIG. 3 shows a block diagram of an enclosure unit containing the system of the present invention according to an example embodiment of the present invention. In FIG. 3, LAN 14 that includes one or more hubs 38, and one or more displays 12 are all housed in an enclosure unit 40. Enclosure unit 40 may be placed in any location at the hot spot, for example, near the cash register, on the floor, on a shelf, or on a wall.

Figure 4:
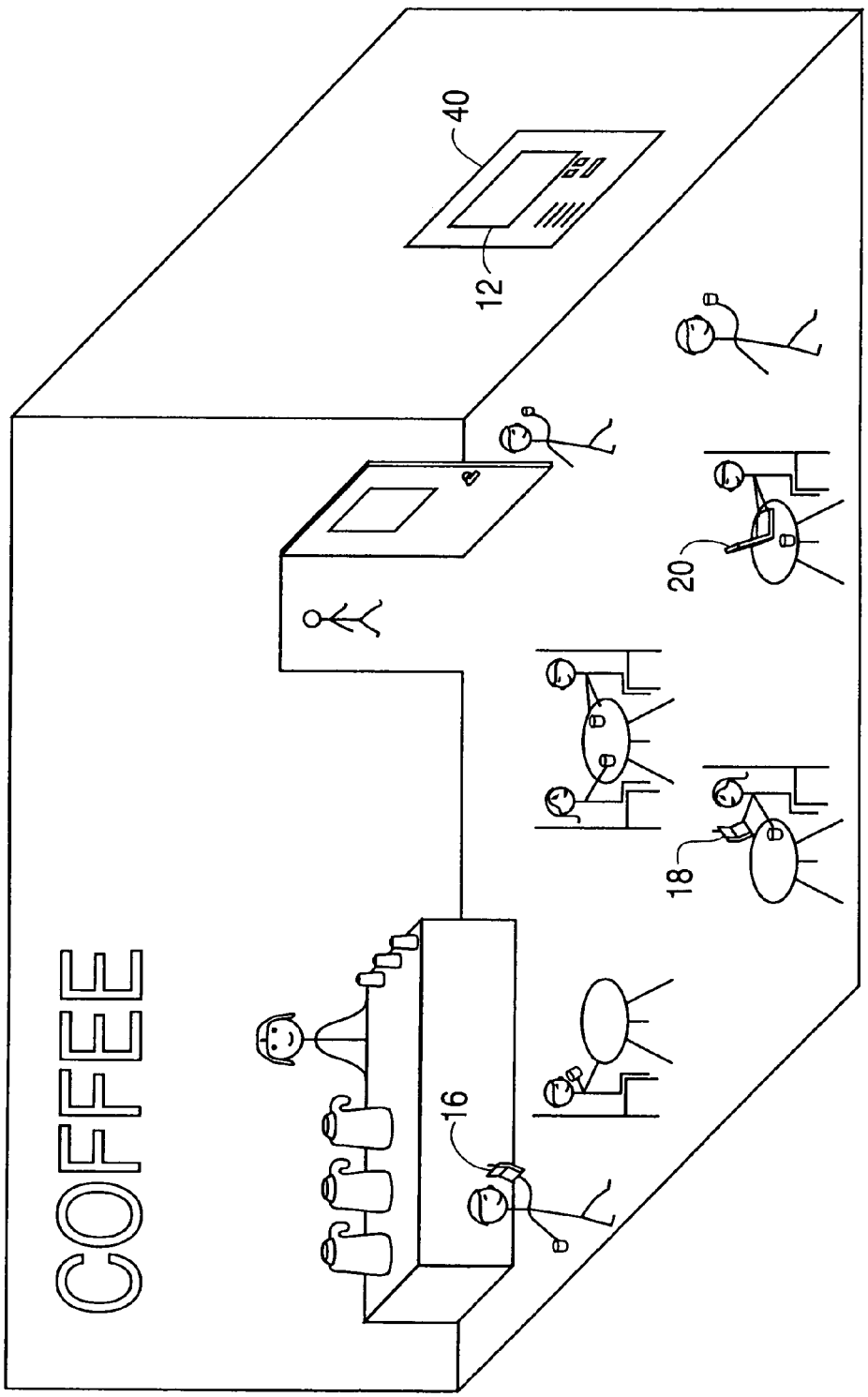
FIG. 4 is a diagram of the interior of an example hot spot according to an example embodiment of the present invention.

FIG. 4 shows a diagram of a portion of the interior of an example hot spot according to an example embodiment of the present invention. In this example, the hot spot is a coffee shop, and enclosure 40 is mounted on a wall of the hot spot. As shown in FIG. 4, display 12 can be viewed by patrons at the hot spot. Patrons at the hot spot may access the LAN using mobile devices such as a mobile phone 16, a personal digital assistant 18, or a portable computer 20. As can be seen in FIG. 4, all patrons at the hot spot (even those without a wireless device connected to the LAN) may view display 12 at the hot spot.

Wireless connections in a system according to the present invention (i.e., between the hub, LAN, display, communications data network, advertising server, local server, mobile device, etc.) may be accomplished by any of many wireless connections, for example, 802.11, infrared, Bluetooth, optical, radio frequency(RF), or other methods and still be within the spirit and scope of the present invention. The display may be just a monitor, or may be a touch-screen display. Further, the hub may be remotely controllable by the operator at the hot spot, e.g., by use of a remote control device. Further, the commercial messages, or other information that may be displayed may be based upon the type of content desired by a particular user when he enters the hot spot. For example, users may have their mobile devices programmed to request certain information be displayed that the individual users have an interest in. The advertising server may receive these requests, and send display messages or other information accordingly based on the users' requests.

In another embodiment of the present invention, customers at a commercial establishment, such as a department store or a grocery store, may avoid waiting in line to pay for their purchases by using their mobile device to access a wireless "paying network" at the establishment and get their name placed in a checkout queue. Information identifying customers in the queue, such as name, id, or some other information, may be displayed in the establishment such that customers know exactly when they are next to be seen by the cashier to pay for their purchases. New checkout customers may be added to the bottom of the queue, and their name would rise to the top of the queue as those customers in front of them in the queue pay for their purchases. The information in the queue is displayed such that customers may browse the store or do other things while waiting to pay for their purchases, and need not stand in a line and wait. The store may retrieve demographic information from the customers in the checkout queue, and based on this demographic information, select advertisements that are displayed in the store near or with the display of the checkout queue.

Figure 5:
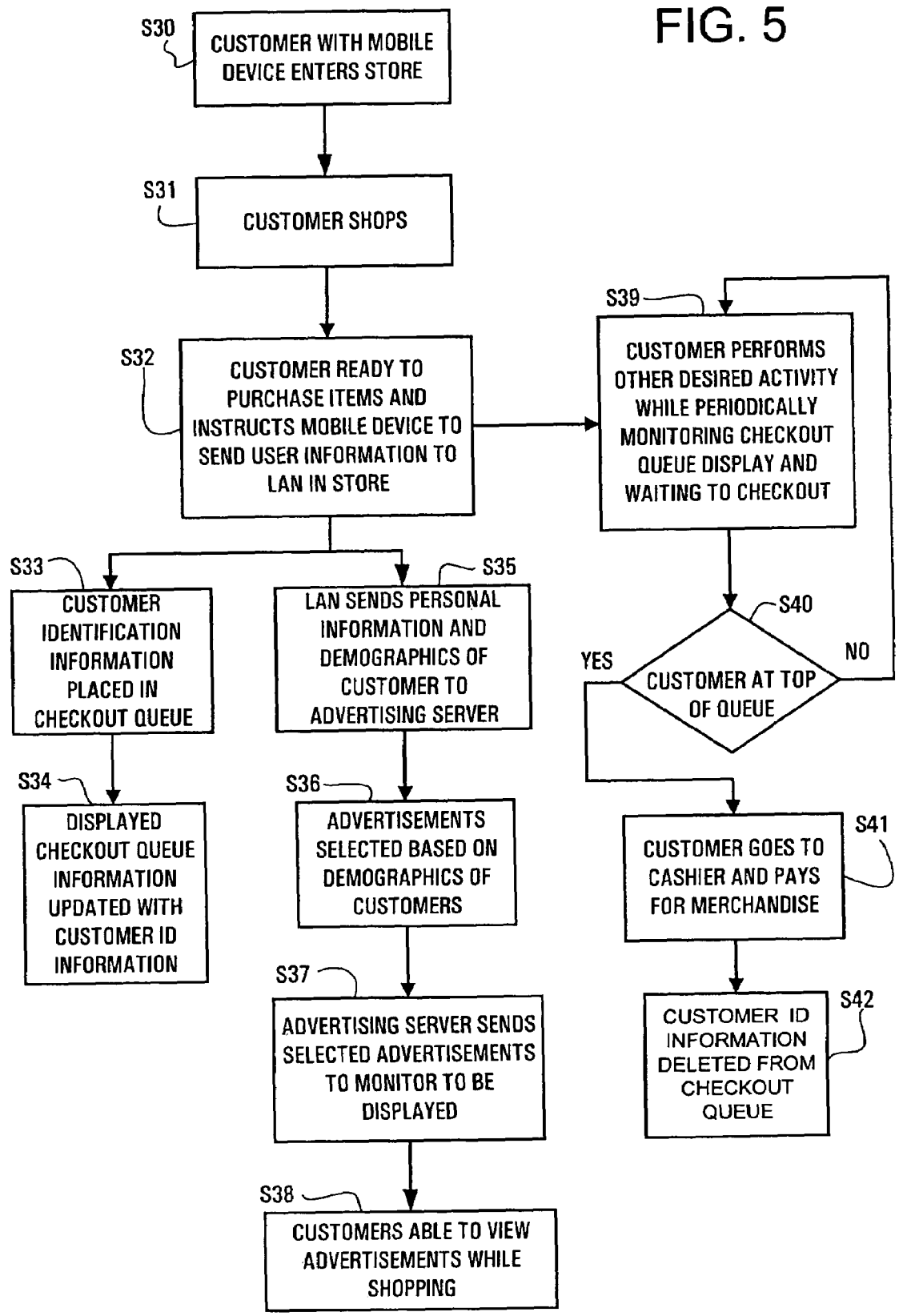
FIG. 5 is a flowchart of an example process for providing public wireless paying network access according to an example embodiment of the present invention.

FIG. 5 shows a flowchart of an example process for providing public wireless paying network access according to an example embodiment of the present invention. A customer with a mobile device enters a store S30. The customer shops S31. The customer completes their shopping and is now ready to purchase some items. The customer instructs the mobile device to send the user's information to a LAN in the store S32. The LAN is a "paying network" that may be used by customers that have selected and are ready to purchase items in the store. The user information may include personal information about the user as well as demographic information about the user. User identification information is placed in a checkout queue S33. The checkout queue contains identification information (name, id number, etc.) for users that have accessed the paying network and are ready to pay for their items (i.e., checkout). The checkout queue is always displayed and continuously updated with new customers being added and customers that have completed their purchases being deleted. The displayed checkout queue information is updated with the customer identification information S34.

The LAN sends the personal information and demographics of the customer to an advertising server S35. The advertising server may contain advertisements related to products in the store, or other items. Some advertisements are selected based on the demographics of customers in the checkout queue S36. The advertising server sends these selected advertisements to one or more monitors or displays in the store to be viewed S37. This may be displayed on the same display as the checkout queue, or on one or more different displays in the store. All customers are able to view the advertisements while in the store, e.g., while shopping S38. The store may experience increased sales in advertised merchandise, or related merchandise. Customers in the checkout queue may perform other desired activities while periodically monitoring the checkout queue display and waiting to checkout S39. The customer monitors the checkout queue to determine if they are at the top of queue S40. This suggests that the customer is next to be processed by the cashier. If the customer id is at the top of the queue, the customer goes to the cashier and pays for merchandise S41. The customers identifying information is deleted from the checkout queue S42.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for public wireless network access comprising:
   detecting presence of at least one mobile device at a Local Area Network (LAN) location;
   requesting user identification information from the at least one detected mobile device through a wireless access node of the LAN;
   receiving the requested user identification information from the at least one mobile device through the wireless access node of the LAN, the user identification information including personal and demographic information about a user of the at least one mobile device;
   providing access to a global communication data network through a gateway of the LAN to the at least one mobile device in response to receiving the demographic information about the user;
   forwarding at least part of the received demographic information about the user of the at least one mobile device to an advertising server;
   receiving commercial messages from the advertising server, the received commercial messages being selected based on a comparison between the forwarded demographic information of each of the users provided with the access to the global communication data network through the LAN and commercial advertising content at the advertising server; and
   displaying the received commercial messages on at least one display at the LAN location for viewing by all persons at said LAN location including the users provided with the access to the global communication data network through the LAN and other persons not accessing the global communication data network.

2. The method according to claim 1, wherein the advertising server is managed by an advertising service.

3. The method according to claim 1, further comprising receiving payment from the advertising service for display of the commercial messages.

4. The method according to claim 1, further comprising sending payment by the advertising service to an Internet Service Provider for the cost of providing Internet access.

5. The method according to claim 1, further comprising receiving commercial messages based on the demographic information of a single user.

6. The method according to claim 1, further comprising monitoring when users are no longer present at the location.

7. The method according to claim 6, further comprising periodically sending updated demographic information about users of the at least one mobile device at the LAN location to the advertising server.

8. The method according to claim 1, wherein the LAN location is a commercial establishment.

9. The method according to claim 1, further comprising registering each user of the at least one mobile device the after providing access to the to the global communication data network through a gateway of the LAN, the user henceforth being registered at all other participating commercial establishments of the same corporate owner.

10. The method according to claim 1, wherein the requested personal information comprises at least one of name, email address, and social security number.

11. The method according to claim 1, wherein the requested demographic information comprises at least one of age, zip code, income, profession, and sex.

12. The method according to claim 1, wherein the commercial messages comprise product advertisements.

13. The method according to claim 1, wherein the commercial messages comprise advertisements for services.

14. The method according to claim 1, wherein the LAN comprises a Wireless Local Area Network (WLAN).

15. The method according to claim 1, wherein the global communication data network comprises the Internet.

16. The method according to claim 1, wherein the wireless access node comprises a hub on the LAN.

17. The method according to claim 1, wherein the LAN comprises a Bluetooth network.

18. A system for providing public wireless Internet access comprising:
   a hub, the hub operatively connected to a global communication data network through a gateway;
   at least one display device operatively connected to the hub, the at least one display device displaying commercial messages received from an advertising server connected to the global communication data network; and
   a Local Area Network (LAN) operatively connected to the hub,
   wherein the hub detected mobile devices at LAN location to access the global communication data network through the gateway in response to receiving demographic information about users of the mobile devices,
   wherein the demographic information is received in response to requesting user identification information from each of the detected mobile devices, the user identification information including personal and demographic information about the users of the mobile devices,
   wherein the displayed commercial messages received from the advertising server are selected based on a comparison between the received demographic information of the users of the mobile devices provided with the access to the global communication data network and commercial advertising content at the advertising serve.

19. The system according to claim 18, wherein the display device comprises one of a Liquid Crystal Display (LCD), touch screen display, E-ink display, autostereoscopic lenticular monitor display, and Cathode Ray Tube (CRT) display.

20. The system according to claim 18, further comprising an enclosure, the hub, the display, and the LAN being contained in the enclosure.

21. The system according to claim 20, wherein the enclosure resides at a commercial establishment.

22. The system according to claim 21, wherein only mobile devices at the commercial establishment have accessibility to the LAN.

23. The system according to claim 20, wherein the enclosure is wall mountable.

24. The system according to claim 18, wherein the LAN comprises a Wireless Local Area Network (WLAN).

25. The method according to claim 18, wherein the LAN comprises a Bluetooth network.

26. The system according to claim 18, wherein the global communication data network comprises the Internet.

27. An article comprising a storage medium having instructions stored therein, the instructions when executed causing a processing device to perform:
   requesting user identification Information from at least one mobile device by a hub on a Local Area Network (LAN), the requesting occurring after detecting the at least one mobile device at a LAN location;
   receiving the requested user identification information from the at least one mobile device at the hub, the user identification information including personal and demographic information about a user of the at least one mobile device;
   providing access to a global communication data network through the hub of the LAN to the at least one mobile device in response to receiving the demographic information about the user
   forwarding at least part of the received demographic information about the user of the at least one mobile device to an advertising server coupled to the LAN;
   receiving commercial messages at the hub from the advertising server, the commercial messages being selected based on a comparison between the forwarded demographic information of each of the users provided with the access to the global data communications network through the LAN and commercial advertising content at the advertising server; and
   displaying the received commercial messages on at least one display at the LAN location for viewing by all persons at the LAN location including the users provided with the access to the global communication data network through the LAN and other persons not accessing the global communication data network.

28. The article according to claim 27, the processing device further performing monitoring when users are no longer present at the location, the monitoring being performed by the hub.

29. The article according to claim 27, the processing device further performing periodically sending updated demographic information about users of the at least one mobile devices at the location to the advertising server.

30. The article according to claim 27, wherein the LAN comprises a Wireless Local Area Network (WLAN).

31. The method according to claim 27, wherein the LAN comprises a Bluetooth network.

32. The article according to claim 27, wherein the global communication data network comprises the Internet.

33. A processing device having instructions stored therein, the processing device connected to a Local Area Network (LAN), the instructions when executed causing the processing device to perform:
   requesting user identification information from at least one mobile device by the processing device, the requesting occurring after detecting the at least one mobile device at a LAN location;
   receiving the requested user identification information from the at least one mobile device at the processing device, the user identification information including personal and demographic information about a user of the at least one mobile device;
   providing access to a global communication data network through the hub of the LAN to the at least one mobile device in response to receiving the demographic information about the user
   forwarding at least part of the received demographic information about the user of the at least one mobile device to an advertising server coupled to the LAN;
   receiving commercial messages at the processing device from the advertising server, the commercial messages being selected based on a comparison between the forwarded demographic information of each of the users provided with the access to the global communication data network through the LAN and commercial advertising content at the advertising server; and
   displaying the received commercial messages on at least one display at the LAN location for viewing by all persons at the LAN location including the users provided with the access to the global communication data network through the LAN and other persons not accessing the global communication data network.

34. The processing device according to claim 33, the processing device further monitoring when users are no longer present at the location.

35. The processing device according to claim 33, the processing device further periodically sending updated demographic information about users of the at least one mobile device at the location to the advertising server.

36. The processing device according to claim 33, wherein the LAN comprises a Wireless Local Area Network (WLAN).

37. The processing device according to claim 33, wherein the LAN comprises a Bluetooth network.

38. The processing device according to claim 33, wherein the global communication data network comprises the Internet.

39. A method for public wireless paying network access comprising:
   receiving a selection of items to purchase at a commercial establishment by a customer;
   receiving customer identification information from a mobile device of the customer to a local at the commercial establishment through an access node of Local Area Network (LAN), the LAN providing wireless network access to a global communication data network, the customer information including personal and demographic information about the customer;
   placing the customer identification information for the customer into a queue, the queue identifying customers ready to purchase items selected by each customer, the customer identification information being placed on the queue in a chronological order, the contents of the queue being displayed at the commercial establishment for viewing by all persons;

forwarding at least part of the demographic information about each customer on the queue to an advertising server coupled to the LAN;

receiving commercial messages from the advertising server, the commercial messages being selected based on a comparison between the demographic information of each of the customers provided with access to the LAN and commercial advertising content at the advertising server; and displaying the received commercial messages on at least one display at the LAN commercial establishment for viewing by all persons at the commercial establishment including the customers provided with the access to the global communication data network through the LAN and other persons not accessing the global communication data network.

40. The method according to claim 39, further comprising monitoring, by the customer, when it is the customer's turn, the customer paying for the selected items when it is the customer's turn.

41. The method according to claim 39, further comprising deleting the customer from the queue after the customer has purchased the selected items.

42. The method according to claim 39, wherein the LAN allows access by at least one of a WLAN compatible device and a Bluetooth compatible device.

* * * * *

UNITED STATES PATENT AND TRADEMARK OFFICE
CERTIFICATE OF CORRECTION

PATENT NO. : 7,062,469 B2  
APPLICATION NO. : 09/750772  
DATED : June 13, 2006  
INVENTOR(S) : Stephan Meyers et al.

Page 1 of 1

It is certified that error appears in the above-identified patent and that said Letters Patent is hereby corrected as shown below:

In Column 10, Claim 18, Line 46:
    Please replace "hub detected" with --hub allows detected--

In Column 10, Claim 18, Line 62:
    Please replace "serve." with --server--

In Column 11, Claim 27, Line 22:
    Please replace "Information" with --information--

In Column 12, Claim 39, Line 55:
    Please delete "to a local"

In Column 12, Claim 39, Line 56:
    Please replace "of Local" with --of a Local--

Signed and Sealed this

Twentieth Day of February, 2007

JON W. DUDAS  
*Director of the United States Patent and Trademark Office*